US012784027B2

(12) United States Patent
Gunda et al.

(10) Patent No.: US 12,784,027 B2
(45) Date of Patent: Nov. 3, 2026

(54) FRICTIONLESS VISION-BASED CHECKOUT

(71) Applicant: NCR Voyix Corporation, Atlanta, GA (US)

(72) Inventors: Praneeth Kumar Gunda, Hyderabad (IN); Gina Torcivia Bennett, Lawrenceville, GA (US); Aravind Kumar Molugu, Hyderabad (IN); Kip Oliver Morgan, Atlanta, GA (US)

(73) Assignee: NCR Voyix Corporation, Atlanta, GA (US)

( * ) Notice: Subject to any disclaimer, the term of this patent is extended or adjusted under 35 U.S.C. 154(b) by 140 days.

(21) Appl. No.: 18/103,913

(22) Filed: Jan. 31, 2023

(65) Prior Publication Data

US 2024/0257094 A1 Aug. 1, 2024

(51) Int. Cl.

| | |
|---|---|
| ***G06Q 20/32*** | (2012.01) |
| ***G06Q 20/20*** | (2012.01) |
| ***G06Q 20/22*** | (2012.01) |
| ***G06Q 20/36*** | (2012.01) |

(52) U.S. Cl.

CPC ....... *G06Q 20/3274* (2013.01); *G06Q 20/204* (2013.01); *G06Q 20/227* (2013.01); *G06Q 20/3224* (2013.01); *G06Q 20/367* (2013.01); *G06Q 2220/00* (2013.01)

(58) Field of Classification Search

None

See application file for complete search history.

(56) References Cited

U.S. PATENT DOCUMENTS

| | | | | |
|---|---|---|---|---|
| 9,652,770 | B1 | 5/2017 | Kurani et al. | |
| 2012/0185317 | A1 | 7/2012 | Wong | |
| 2013/0223673 | A1 | 8/2013 | Davis et al. | |
| 2013/0240622 | A1 | 9/2013 | Zhou et al. | |
| 2014/0244494 | A1 | 8/2014 | Davis et al. | |
| 2015/0142672 | A1 | 5/2015 | Ling | |
| 2016/0253651 | A1 * | 9/2016 | Park | G06Q 20/34 705/39 |
| 2017/0161728 | A1 * | 6/2017 | Satyanarayan | G06Q 20/363 |
| 2018/0293573 | A1 * | 10/2018 | Ortiz | G06Q 20/20 |

(Continued)

OTHER PUBLICATIONS

"European Application Serial No. 23220872.8, Extended European Search Report mailed Apr. 10, 2024", 9 pgs.

(Continued)

*Primary Examiner* — Chrystina E Zelaskiewicz

(74) *Attorney, Agent, or Firm* — Schwegman Lundberg & Woessner, P.A.

(57) ABSTRACT

A payment code is generated for a transaction. The payment code includes a substring of information that identifies the code as a payment token for a frictionless payment of the transaction. The substring of information includes a payment token identifier that identifies the payment code as being representative of a payment request. The substring of information, when captured in an image taken of a transaction area for the transaction or when scanned, causes the terminal to enter a payment state during which payment details are obtained from the payment code and a payment service is contacted with the payment details based on the payment type. The terminal processes a frictionless payment for the transaction through the payment service to complete the transaction.

19 Claims, 7 Drawing Sheets

(56) References Cited

U.S. PATENT DOCUMENTS

| | | | | |
|---|---|---|---|---|
| 2021/0110369 | A1* | 4/2021 | Hamasako ....... | G06Q 20/40155 |
| 2021/0406859 | A1* | 12/2021 | Morgan ................. | G06Q 20/02 |
| 2022/0414644 | A1* | 12/2022 | Hashimoto ........ | G06Q 20/3276 |

OTHER PUBLICATIONS

"European Application Serial No. 23220872.8, Communication pursuant to Article 94(3) EPC mailed Jul. 10, 2025", 15 pgs.

"European Application Serial No. 26168276.9, Extended European Search Report mailed Jun. 15, 2026", 12 pgs.

* cited by examiner

FRICTIONLESS VISION-BASED CHECKOUT

BACKGROUND

In a typical vision-based checkout scenario, a customer places their items on a tray, images of the items are captured, the items are recognized using the captured images, and the customer uses a personal identification number (PIN) pad or card reader to complete the transaction. While vision-based checkout approaches seek to make the customer experience more frictionless, payment processing—which requires customer operation of the PIN pad and/or card reader at the checkout—remains a point of friction.

SUMMARY

In various embodiments, methods and a system for frictionless vision-based checkouts are presented. A mobile application converts loyalty and/or payment details for a payment of a shopper into a code based on a store of a shopper. The application modifies the code with a prefix or postfix string of information. A transaction manager of a vision-based checkout system recognizes the modified code as a payment request of the shopper. The code can be displayed on the shopper's phone, and the phone can be placed on a tray alongside the items being purchased by the shopper such that the displayed code is visible to a camera or a barcode reader of the vision-based checkout system.

According to embodiments of the technology disclosed herein, an enhanced vision-based checkout system and methods are provided that recognize the phone as a non-salable personal item of the shopper, recognize a code displayed on the phone as being representative of a payment request, and provide the displayed code to the transaction manager. In some embodiments, after receiving confirmation from the vision-based checkout that all items are accounted for in the transaction, the transaction manager displays a countdown clock on a display of the self-checkout to the shopper. If the shopper takes no action, the code displayed on the phone is decoded to obtain payment card details and select a payment service associated with the payment card type. The transaction manager processes the payment through the payment service and the transaction completes in a frictionless manner (i.e. without the shopper being required to operate the card reader or the PIN pad to provide payment for the transaction). In an embodiment, the code when decoded by the transaction manager also identifies a store loyalty account for the shopper, which the transaction manager uses to record the appropriate loyalty credits for the transaction in the shopper's loyalty account.

DETAILED DESCRIPTION

While vision-based checkout scenarios seek to reduce friction in the customer checkout experience, payment processing remains a point of friction as it requires the shopper to operate the card reader of the terminal and/or the PIN pad to provide payment information to complete the transaction. The techniques presented herein and below provide a mobile application that allows a shopper to register various payment methods for use in stores to provide a frictionless payment experience for the shopper. The application generates a code that includes a prefix or postfix string of information that identifies the code as a payment code and that further identifies the type of payment being used. The code with the prefix or postfix information is displayed on a user-operated device, and responsive to the code being identified in an image or a scan of the display of the user-operated device, the transaction manager of the terminal decodes the code and selects the payment service used by the store for the payment type. The transaction manager uses the decoded payment details to process a payment for the transaction. As such, shoppers are provided a frictionless payment experience whereby they can place items on a tray of a vision-based checkout system alongside the payment code being displayed on the display of a mobile device to enable a payment without requiring the shopper to interact with a PIN pad or card reader.

Most shoppers have some form of digital payment available to them at all times (e.g., a credit card, a digital wallet, digital payment services, etc.). Some of these payment forms can be digitized into a barcode that can be shown via a phone of the shopper. The barcode is coarse enough to be recognized with an overhead vision checkout camera or scanned with a barcode scanner during checkout.

As used herein the terms, "shopper," "consumer," "customer," and/or "user" may be used synonymously and interchangeably herein and may refer to an individual who is performing a checkout at a transaction terminal utilizing the frictionless payment techniques described in detail herein.

Figure 1A:
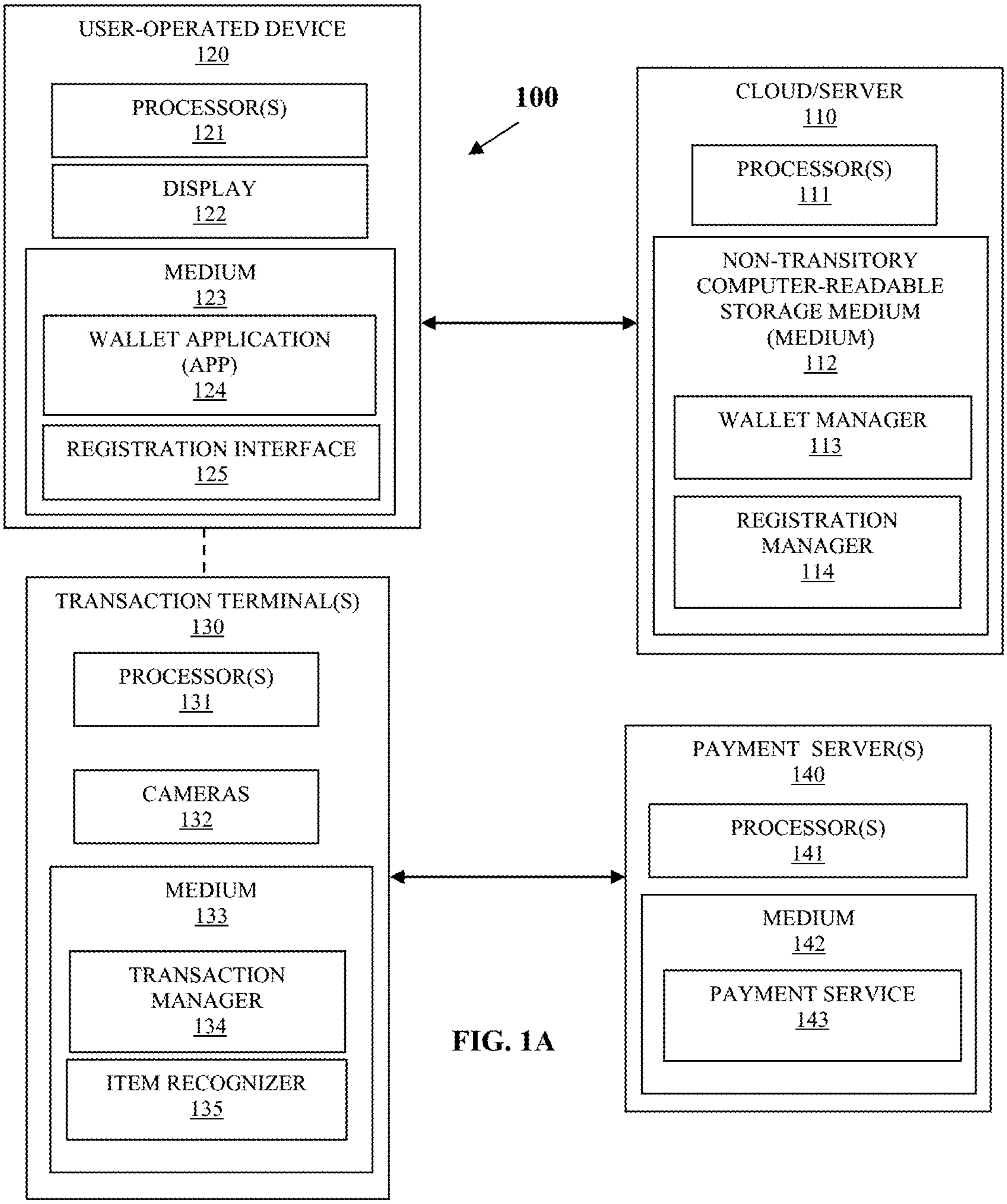
FIG. 1A is a diagram of a system for frictionless vision-based checkouts, according to an example embodiment.

FIG. 1A is a diagram of a system 100 for frictionless vision-based checkouts, according to an example embodiment. The system 100 is shown schematically in greatly simplified form, with only those components relevant to an understanding of one or more embodiments (represented herein) being illustrated. The arrangement of the components are presented for purposes of illustration only. It is to be noted that other arrangements with more or less components are possible without departing from frictionless vision-based checkouts presented herein and below.

Moreover, various components are implemented as one or more software modules, which reside in non-transitory storage and/or hardware memory as executable instructions that when executed by one or more hardware processors perform the processing discussed herein and below.

System 100 includes a cloud 110 or a server 110 (hereinafter just "cloud 110"), user-operated devices 120, transaction terminals 130, and payment servers 140. Cloud 110 includes one or more processors 111 and a non-transitory computer-readable storage medium 112 (herein after just "medium"), which includes instructions for a wallet manager 113 and a registration manager 114. The instructions when provided to processor 111 cause processor 111 to perform operations discussed herein and below with respect to 113-114.

Each user-operated device 120 includes one or more processors 121, a display 122, and medium 123, which includes instructions for a wallet manager 124 and registration interface 125. The instructions when provided to processor 121 cause processor 121 to perform operations discussed herein and below with respect to 123-125.

Each transaction terminal 130 includes one or more processors 131, cameras 132, and medium 133, which includes instructions for a transaction manager 134 and an item recognizer 135. The instructions when provided to processor 131 cause processor 131 to perform operations discussed herein and below with respect to 134 and 135.

Each payment server 140 includes one or more processors 141 and medium 142, which includes instructions for a payment service 143. The instructions when provided to processor 141 cause processor 141 to perform operations discussed herein and below with respect to 143.

Initially, registration manager 114 interacts with a shopper through registration interface 125 for purposes of registering payment methods of the shopper. These payment methods can include credit cards, credit cards specific to particular retailers, known as store-specific cards, digital wallets, payment services, Apple Pay®, etc. Digital wallets (e.g., Apple Pay®) and payment services (e.g., PayPal®)

Separately, a retailer can register with registration manager 114 via a registration interface (not shown in FIG. 1A). In some embodiments, the retailer can specify the payment methods that will be recognized for frictionless transaction payments and/or the retailer can specify the payment services 143 that the store's transaction terminals 130 interact with for transaction payments.

In some embodiments, registration manager 114 configures a wallet application ("app") 124 on behalf of the shopper. The wallet app 124 may have previously been downloaded and installed on device 120 or can be configured, downloaded, and installed at the conclusion of registration, by registration manager 114. In the case where the wallet app 124 is pre-installed on device 120, the registration manager 114 may use an application programming interface (API) to configure wallet app 124 with the registered payment methods.

Following the appropriate registrations, system 100 operates as follows. A shopper places items for a vision-based checkout in a store at a terminal 130. Wallet app 124 can determine the store of the shopper based on a reported location of the device 120. Alternatively, a shopper operating a user interface of wallet app 124 can select the current store of the shopper. The registered payment methods available to the shopper are determined by the payment services 143 used by terminal 130 of the store. Thus, wallet app 124 presents available registered payment methods available from wallet app based on identification of the store, which can be automatically determined through location data or selected by the shopper through the user interface.

The shopper selects a payment method from a list of available payment methods through the user interface of wallet app 124. This causes wallet app 124 to generate a code the encodes the payment details of the selected payment method. The code is modified to include an encoded string of information that identifies the code as a payment token through a unique payment token identifier and that identifies the payment method being made. The string of information is prepended or appended to the code that encodes the payment details to create a modified code. Wallet app 124 displays the modified code on the display 122 of device 120. A sufficient amount of the available space on the display 122 is used to present the modified code to ensure that the modified code is captured by an overhead camera 132 of the terminal 130.

The modified code can also be set by wallet app 124 to be temporary such that it expires and is not displayable or usable after a preconfigured period of time. In such a case, the string of information appended or prepended to the code includes a date and time stamp for expiration. The string of information may also encode a number of permissible uses of the payment token, such that when transaction manager 134 encounters the payment token more than the threshold number of permissible uses, the payment token is ignored or is unusable.

Alternatively, the modified code is generated by wallet manager 113 when wallet app 124 reports the shopper's device location and/or the shopper's selected store and indicates that the shopper is requesting a payment token or a modified payment code (e.g., payment details with the prepended or appended string of information). Wallet manager 113 then generates the modified code and provides the modified code back to wallet app 124 for displaying on the display 122 of device 120.

The shopper places device 120 with the display facing up towards the overhead camera 132 of terminal 130 alongside the items that the shopper desires to purchase for the transaction. In example embodiments, transaction manager 134 of terminal 130 identifies the payment code and displays, on a terminal display, a message indicating that payment for the transaction will proceed in a predefined number of countdown seconds unless the shopper cancels the payment processing via a touch option presented on the terminal display to the shopper. The countdown timer may be configurable. Assuming the shopper does not cancel the payment, and at the end of the countdown timer, transaction manager 134 decodes the modified payment code to obtain the payment details and uses the payment details to interact with an appropriate payment service 143 to obtain payment for the transaction.

When the modified code is associated with a temporary payment token, transaction manager 134 compares the date and time stamp for expiration with a current date and time. Transaction manager 134 ignores the modified code if the current date and time are past the date and time stamp for expiration. Transaction manager 134 may present a message on the transaction display indicating that the payment token is expired and/or is unusable as payment for the transaction. In some embodiments, the payment code may encode a permissible number of uses within the string of information. For example, if the number of uses is set to 1, the payment token is usable just once. Transaction manager 134 can report the use of the token to a store server, such that each terminal 130 of a store can compare the payment token's number of uses against the number of permissible uses each time the modified code is encountered and ensure that only the authorized number of uses are allowed for transaction payments.

Item recognizer 135 is trained to identify user devices 120, such as phones, tablets, watches, etc. When item recognizer recognizes a user device 120, an image of the device is provided to transaction manager 134. Transaction manager 134 decodes the image provided by recognizer 135 and identifies the modified code as a payment code based on the prepended or appended string of information. The transaction manager 134 further identifies the type of payment and the payment details for the payment type from the payment code. This causes transaction manager 134 to enter a payment state for the transaction after a countdown timer is completed unless a cancel input is received from the shopper.

Item recognizer 135 is also trained to identify each item placed on a tray under the cameras 132. Each item identifier is provided to transaction manager 134 for processing with the transaction.

Figure 1B:
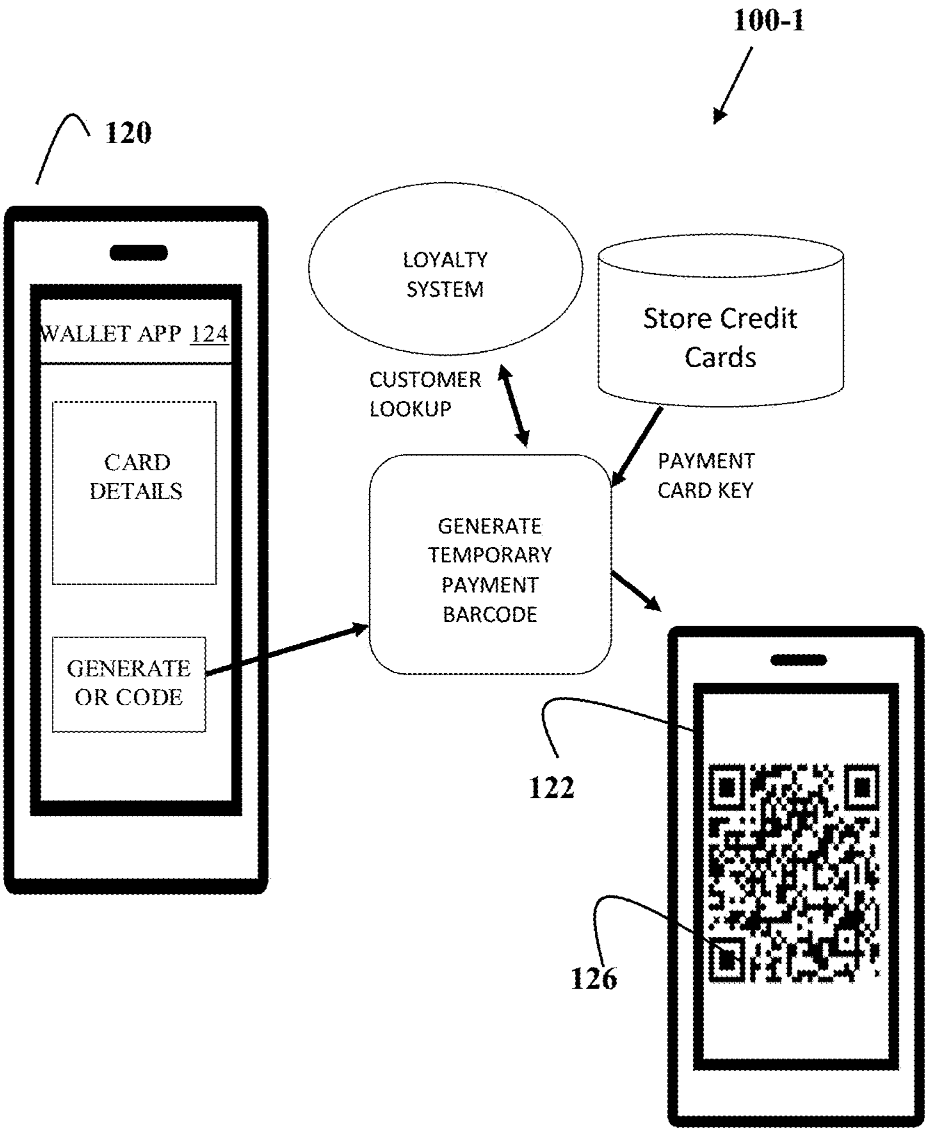
FIG. 1B is a diagram illustrating generation and display of a payment code, according to an example embodiment.

Additional embodiments and details are now continued with reference to FIG. 1B. FIG. 1B is a diagram 100-1 illustrating generation and display of a payment code, according to an example embodiment.

Diagram 100-1 depicts a user device 120 with a user interface for wallet app 124, operations performed when the shopper selects the generate quick response (QR) code option from the user interface, and a resulting payment token in the form of a QR code 126 depicted on the display 122 of device 120 after the operations are performed. The shopper can be presented with selectable payment method option(s) based on the location of device 120. Alternatively, the shopper may select a payment method within a user interface screen that precedes the user interface displaying the card details. The operations can include looking up a loyalty identifier for the shopper in a loyalty system of the store, obtaining a payment key for the card details, and generating a temporary payment barcode. The string of information that identifies the code as a payment token and that further identifies the payment type for the payment card details may be prepended or appended to the barcode and encoded as a QR code 126 displayed by wallet app 124 on display 122 of device 120. The QR code 126 includes the string of information and the card details and the QR code 126 can be generated by wallet app 124 or by wallet manager 113 on behalf of the wallet app 124. In some embodiments, a first string of information may be prepended to the code to identify it as a payment code and a second string of information may be appended to the code to identify the payment type, or vice versa.

Figure 1C:
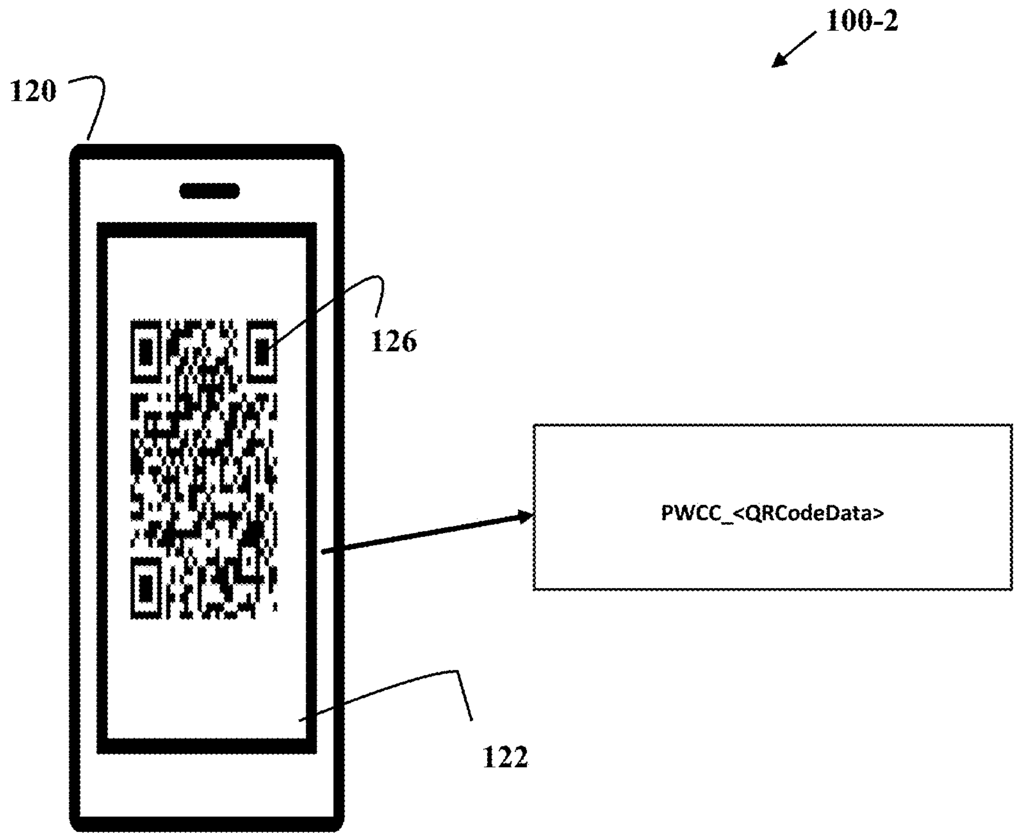
FIG. 1C is a diagram illustrating a string of information that modifies the payment code, according to an example embodiment.

FIG. 1C is a diagram 100-2 illustrating a string of information 128 that modifies the payment code 126, according to an example embodiment. The string of data 128 is shown in the rectangle box pointed to by device 120 as shown in the diagram 100-2. QRCodeData includes the encoded card or payment details, while the string of information 128 PWCC identifies the code as a payment token and identifies a payment type such as an American Express® credit card, a store specific credit card, etc. The string of information 128 is prepended or appended to the card details and encoded in the QR code 126. The string of information when decoded by transaction manager 134 informs transaction manager 134 that a payment token is being presented and that a shopper is requesting payment using the encoded payment details of the payment type.

Figure 1D:
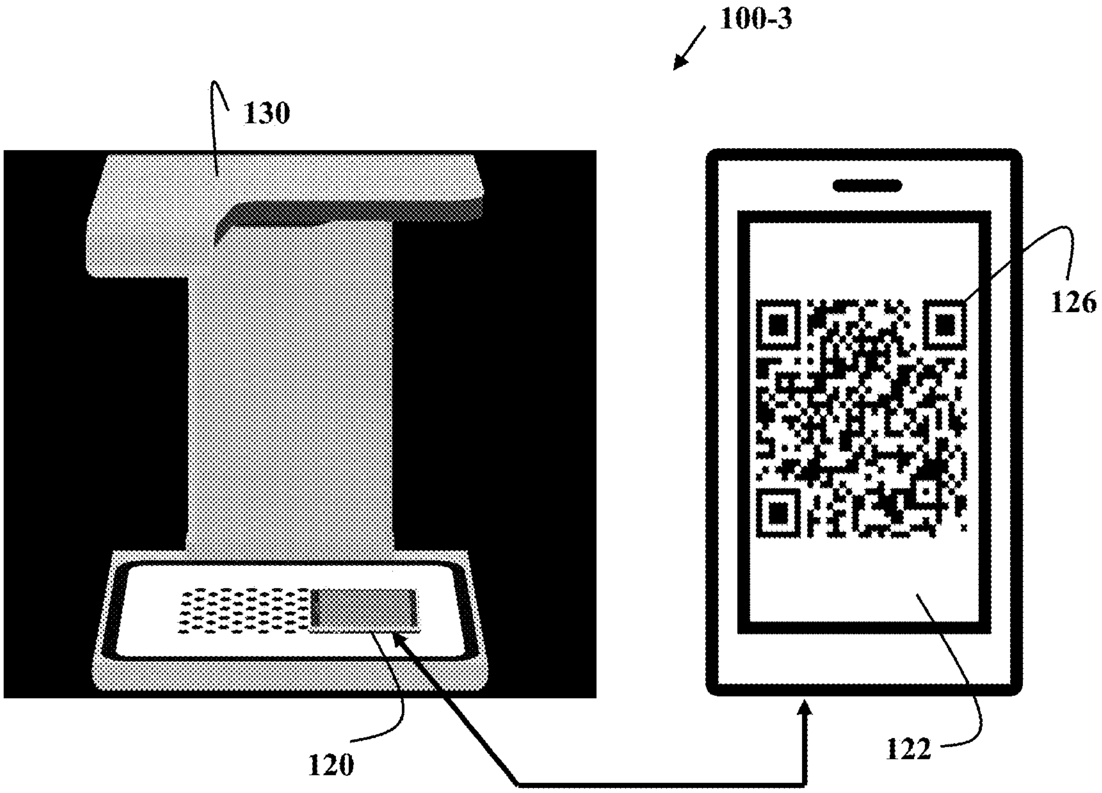
FIG. 1D is a diagram illustrating presentation of a payment code to a camera of a transaction terminal, according to an example embodiment.

FIG. 1D is a diagram 100-3 illustrating presentation of a payment code 126 to a camera 132 of a transaction terminal 130, according to an example embodiment. The lefthand side of diagram 100-3 illustrates components of terminal 130 associated with a vision-based transaction. The righthand side of diagram 100-3 illustrates the QR code 126 displayed on the display 122 of device 120. The shopper places the device 120 with the display 122 facing up towards a camera 132 (hidden from view in diagram 100-3). This permits item recognizer 135 to identify the device 120 capture an image of the QR code 126 and provide the QR code 126 to transaction manager 134. Transaction manager 134 decodes the string of information and identifies the image as being of a payment token and performs frictionless payment processing on behalf of the shopper for a transaction.

Figure 1E:
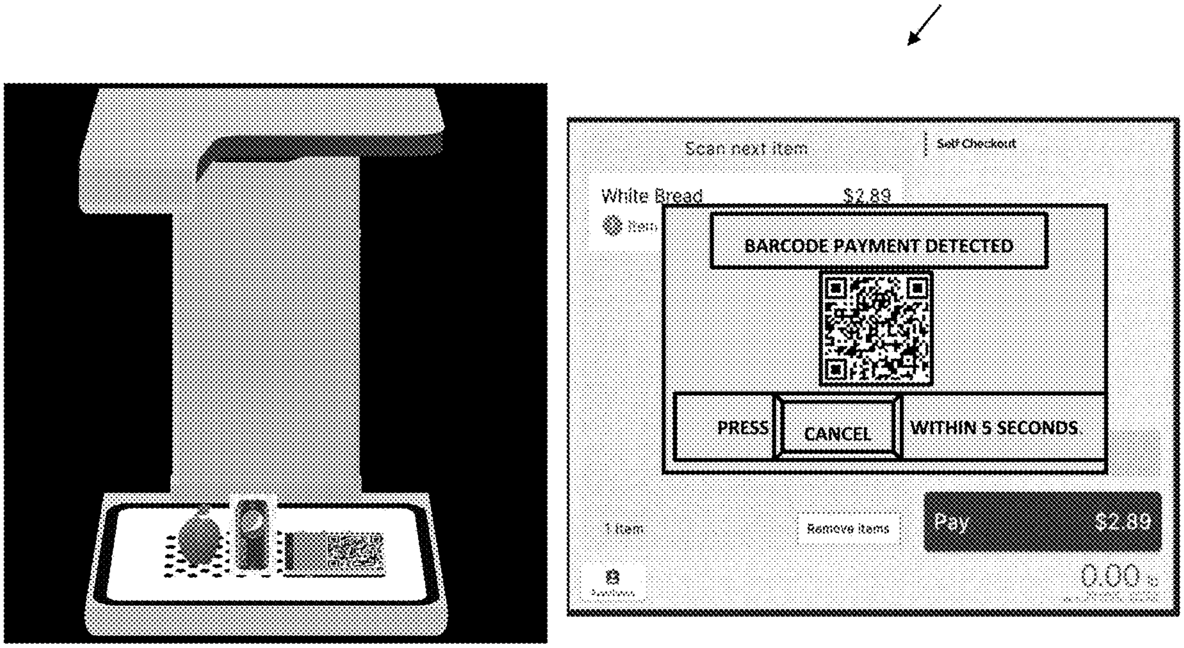
FIG. 1E is a diagram illustrating a checkout at a transaction terminal with the payment code presented alongside items being purchased and a response from the terminal after recognizing the payment code, according to an example embodiment.

FIG. 1E is a diagram 100-4 illustrating a checkout at a transaction terminal 130 with the payment code presented alongside items being purchased and a response from the terminal 130 after recognizing the payment code, according to an example embodiment. The lefthand side of diagram 100-4 illustrates items to be purchased being placed alongside device 120 with display 122 presenting the payment QR code 126 to a camera 132 (hidden from view in diagram 100-4). From an image of the QR code 126 captured by the camera 132 and provided by the item recognizer 135, transaction manager 134 identifies the information string contained in the QR code 126 that identify the code as representing a payment request. Transaction manager 134 further obtains the type of payment and payment details from the QR code 126. In addition, transaction manager 134 receives the item details for the items from item recognizer 135. Transaction manager 134 then generates a message, which is presented to the shopper on a display of the transaction terminal, as shown on the righthand side of diagram 100-4. The message indicates that a barcode payment was detected and payment processing with an appropriate payment service 143 will begin after a countdown timer has elapsed (e.g., in 5 seconds). The payment is canceled when the shopper activates the cancel option, otherwise transaction manager 134 interacts with the appropriate payment service 143 when the timer expires and obtains payment from the shopper on behalf of the store/retailer.

In an embodiment, the string of information that is appended or prepended to the payment code can include a loyalty account number of the shopper. The shopper can provide the loyalty account during registration. The transaction manager 134 identifies the loyalty account and looks up the shopper's account during a frictionless payment and credits the transaction details to the shopper's loyalty account.

In an embodiment, the payment details are non-card based such as when the payment method selected by a shopper is a payment service 143 (e.g., Venmo®, etc.). In these cases, the payment details encoded in the payment code are details needed by the payment service 143, such as an email address, phone number, etc. This assumes the store accepts the payment service 143 for a given shopper's frictionless transaction.

In an embodiment, the payment code is provided via a near field communication (NFC) transmission from the user device 120 to the terminal 130. This can be done via a tap of device 120 on a designated location terminal 130 having an NFC transceiver.

In an embodiment, the payment code is scanned by the shopper after the shopper scans item codes. In this embodiment, the transaction is not a vision-based checkout transaction. The shopper, however, is still not required to touch a surface of the terminal 130 to perform the transaction since the shopper passes item codes for the items over or in front of the scanner to record the items being purchased and passes the payment code on display 122 of device 120 over or in front of the scanner to initiate payment on the terminal 130.

In an embodiment, wallet app 124 is subsumed into a specific retail store app as an enhancement to the retail store app. In an embodiment, the operations and functions of wallet app 124 are provided within an existing wallet app as an enhancement to the existing wallet app.

In an embodiment, the terminal 130 is a vision-based checkout system, a self-service terminal (SST), or a point-of-sale (POS) terminal. In the case of a POS terminal, the shopper can scan the payment code when the cashier indicates payment is needed by holding the display 122 out for the cashier to scan with a handheld scanner.

System 100 permits frictionless payments during checkouts. Transaction managers 134 are enhanced to identify a string of information prepended to or appended to a payment code. The payment code is identified by the transaction manager 134 as a payment token of a specific payment type. The payment token causes the transaction manager 134 to enter a payment state for the transaction. In an embodiment, the transaction manager provides a countdown before the state is moved to the payment state. The payment details are used by the transaction manager 134 to contact the appropriate payment service 143 and obtain payment for the transaction. This is a frictionless payment because the shopper does not have to operate the touch display of the terminal, a card reader of the terminal, or a PIN pad of the terminal to provide payment. The payment code can be provided during vision-based checkouts, self-checkouts, and/or cashier-assisted checkouts for frictionless payment.

Figure 2:
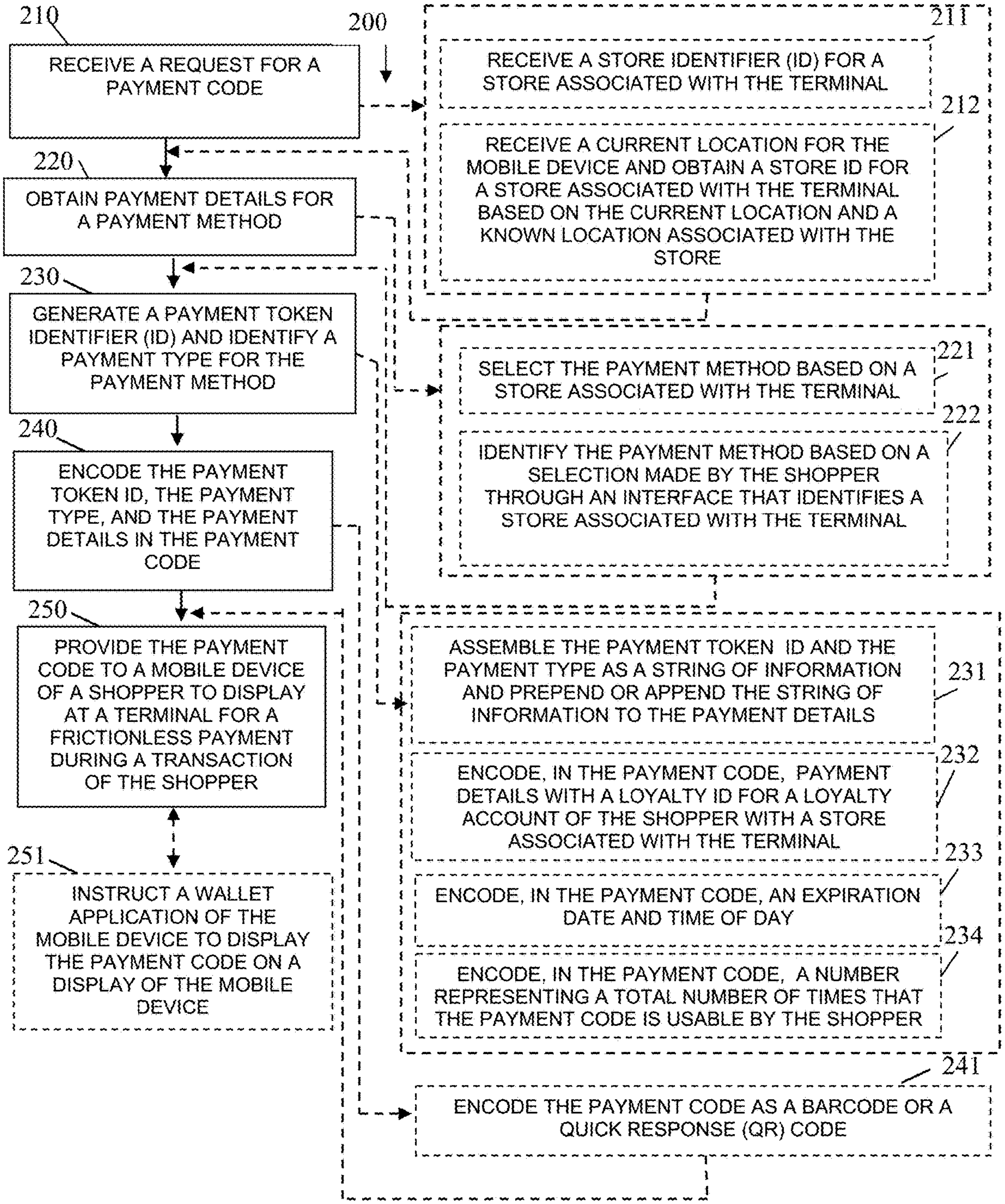
FIG. 2 is a flow diagram of a method for frictionless vision-based checkouts, according to an example embodiment.

The embodiments of FIGS. 1A, 1B, 1C, 1D, 1E, and other embodiments are now discussed with reference to the FIGS. 2-3. FIG. 2 is a flow diagram of a method 200 for frictionless vision-based checkouts, according to an example embodiment. The software module(s) that implements the method 200 is referred to as a "frictionless payment service." The frictionless payment service is implemented as executable instructions programmed and residing within memory and/or a non-transitory computer-readable (processor-readable) storage medium and executed one or more hardware processors of one or more hardware computing devices. The processors of the devices that execute the frictionless payment service are specifically configured and programmed to process the frictionless payment service. The frictionless payment service has access to one or more networks during its processing. The networks can be wired, wireless, or a combination of wired and wireless.

In an embodiment, the device that executes the frictionless payment service is cloud 110. In an embodiment, the device that executes the frictionless payment service is server 110. In an embodiment, the frictionless payment service is all or some combination of 113 and/or 114, as discussed above with system 100.

At 210, the frictionless payment service receives a request for a payment code. In an embodiment, the request is received from wallet app 124.

In an embodiment, at 211, the frictionless payment service receives a store identifier for a store associated with a terminal 130 at which a shopper is performing a vision-based checkout transaction.

In an embodiment, at 212, the frictionless payment service receives a current location of a mobile device 120 of the shopper. The frictionless payment service obtains a store identifier for a store associated with the terminal 130 based on the current location of device 120 and a known location associated with the store or the terminal 130.

At 220, the frictionless payment service obtains payment details for a payment method. The payment details may vary based on the type of payment method. For example, the payment details for a credit card may include account number, billing zip code, security code, etc. The payment details for a payment service (e.g., payment service 143) may include an email or user name, a phone number, etc.

In an embodiment, at 221, the frictionless payment service selects the payment method based on a store associated with the terminal 130. That is, a store identifier is linked to the payment service 143 used by the store. A given payment service 143 accepts only certain types of payment methods. Registered payment methods associated with the shopper are used to select the payment method that comports with the store's payment service 143.

In an embodiment, at 222, the frictionless payment service identifies the payment method based on a selection made by the shopper through an interface that identifies the store associated with the terminal 130. In an embodiment, the interface is the user interface to wallet application 124.

At 230, the frictionless payment service generates a payment token identifier for the payment code and identifies a payment type for the payment method. The identifier is recognizable by a transaction manager 134 of the terminal as identifying a payment token.

In an embodiment, at 231, the frictionless payment service assembles the payment token identifier and the payment type as a string of information. This string of information is prefixed or postfixed onto the payment details by the frictionless payment service. In an embodiment, the payment token identifier may be represented as a first information string prefixed to the payment details, and the payment type may be represented as a second information string postfixed to the payment details, or vice versa.

In an embodiment, at 232, the frictionless payment service encodes, in the payment code, the payment details with a loyalty identifier for a loyalty account of the shopper with a store associated with the terminal 130. In an embodiment, at 233, the frictionless payment service encodes, in the payment code, an expiration date and time of day. In an embodiment, at 234, the frictionless payment service encodes, in the payment code, a number representing a total number of times that the payment code is usable by the shopper.

At 240, the frictionless payment service encodes the payment token identifier, the payment type, and the payment details in a payment code. In an embodiment, at 241, the frictionless payment service encodes the payment code as a barcode or a QR code 126.

At 250, the frictionless payment service provides the payment code to the mobile device 120 of the shopper. The payment code is displayed on a display 122 of device 120 and presented at the terminal 130 for a frictionless payment during a transaction of the shopper. The transaction can be a vision-based checkout transaction, a self-checkout transaction, and/or a cashier-assisted checkout transaction. In an embodiment, at 251, the frictionless payment service instructs a wallet application 124 of the mobile device 120 to display the payment code on a display 122 of the mobile device 120.

Figure 3:
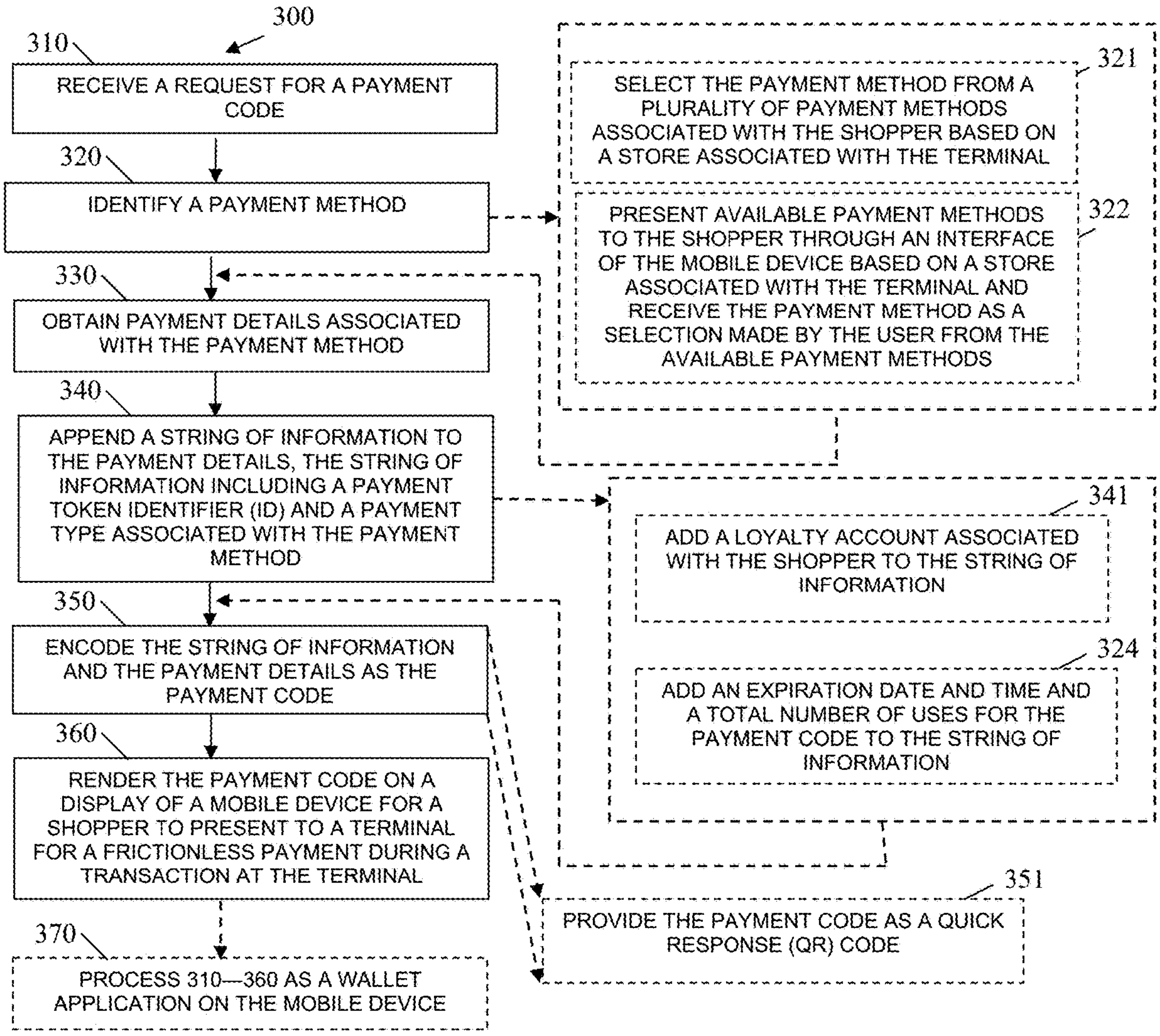
FIG. 3 is a flow diagram of another method for frictionless vision-based checkouts, according to an example embodiment.

FIG. 3 is a flow diagram of another method 300 for frictionless vision-based checkouts, according to an example embodiment. The software module(s) that implements the method 300 is referred to as a "frictionless payment app." The frictionless payment app is implemented as executable instructions programmed and residing within memory and/or a non-transitory computer-readable (processor-readable) storage medium and executed by one or more hardware processors of one or more hardware devices. The processors of the devices that execute the frictionless payment app are specifically configured and programmed to process the frictionless payment app. The frictionless payment app has access to one or more networks during its processing. The networks can be wired, wireless, or a combination of wired and wireless.

The frictionless payment app interacts with the method 200. In an embodiment, the device that executes the frictionless payment app is user-operated device 120. In an embodiment, device 120 is a phone, a tablet, or a watch. In an embodiment, the frictionless payment app is wallet app 124.

At 310, the frictionless payment app receives a request for a payment code. At 320, the frictionless payment app identifies a payment method for the payment code.

In an embodiment, at 321, the frictionless payment app selects the payment method from a plurality of payment methods associated with the shopper based on a store associated with the terminal 130. In an embodiment, at 322, the frictionless payment app presents available payment methods to the shopper through a user interface of the mobile device 120 based on a store associated with the terminal 130. The frictionless payment app receives a selection made by the user from the available payment methods presented through the interface.

At 330, the frictionless payment app obtains payment details associated with the payment method. For example, the payment details may include a user account number, billing zip code, security code, email address, phone number, etc.

At 340, the frictionless payment app appends a string of information to the payment details. The string of information includes a payment token identifier and a payment type associated with the payment method. The payment token identifier allows a transaction manager 134 to identify the code as being representative of a payment request, with a payment type expected thereafter, and then followed by the payment details.

In an embodiment, at 341, the frictionless payment app adds a loyalty account associated with the shopper to the string of information. In an embodiment, at 342, the frictionless payment app adds an expiration date and time for the payment code and a total number of uses for the payment code to the string of information.

At 350, the frictionless payment app encodes the string of information and the payment details as the payment code. In an embodiment, at 351, the frictionless payment app provides the payment code as a QR code 126.

At 360, the frictionless payment app renders the payment code on a display 122 of the mobile device 120 for a shopper to present to the terminal 130 for frictionless payment during a transaction at the terminal 130. That is, an image of the payment code or a scan of the payment code is sufficient for a transaction manager 134 of terminal 130 to enter a countdown for transitioning to a payment state and to process the payment for the shopper using the payment details when the countdown expires.

In an embodiment, at 370, the frictionless payment app is processed as a wallet application 124 on the mobile device 120. The wallet application 124 provides a user interface for the shopper to register payment methods as discussed above with system 100.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

receiving a request for a payment code;

identifying a payment method and a payment type of the payment method;

obtaining payment details for the payment method;

generating the payment code as an encoding of a payment token identifier, the payment type, and the payment details, wherein the payment code is sized and encoded to be recognizable by an overhead vision checkout camera of a terminal;

providing the payment code to a mobile device of a shopper to display at the terminal for a frictionless payment during a transaction of the shopper;

identifying, by the overhead vision checkout camera, the payment code as a payment request when presented on a display of the mobile device and the mobile device is positioned on a tray of the terminal alongside items being purchased with the display facing towards the overhead vision camera;

displaying, on a terminal display, a countdown timer and a message indicating that a payment for the transaction will proceed in accordance with the countdown timer unless canceled by the shopper via a touch option presented on the terminal display; and processing the payment type associated with the payment code using the payment details as the payment for the transaction based on recognition of the payment request unless canceled by the shopper before the countdown timer expires, wherein receiving further includes receiving a store identifier for a store associated with the terminal.

2. The method of claim 1, wherein receiving further includes receiving a current location for the mobile device and obtaining the store identifier for the store associated with the terminal based on the current location and a known location associated with the store.

3. The method of claim 1, wherein identifying the payment method includes selecting the payment method based on the store associated with the terminal.

4. The method of claim 1, wherein identifying the payment method includes identifying the payment method based on a selection made by the shopper through an interface that identifies the store associated with the terminal.

5. The method of claim 1, further comprising assembling the payment token identifier and the payment type as a string of information, wherein generating the payment code includes prepending or appending the string of information to the payment details.

6. The method of claim 1, wherein generating the payment code further includes encoding, in the payment code, a loyalty identifier for a loyalty account of the shopper with the store associated with the terminal.

7. The method of claim 1, wherein generating the payment code further includes encoding, in the payment code, an expiration date and time of day.

8. The method of claim 1, wherein generating the payment code further includes encoding, in the payment code, a number representing a total number of times that the payment code is usable by the shopper.

9. The method of claim 1, wherein generating the payment code further includes encoding the payment code as a barcode or a quick response (QR) code.

10. The method of claim 1, wherein providing further includes instructing a wallet application of the mobile device to display the payment code on the display of the mobile device.

11. A method, comprising:
- receiving a request for a payment code;
- identifying a payment method for the payment code;
- obtaining payment details associated with the payment method;
- appending a string of information to the payment details, wherein the string of information at least comprises a payment token identifier for a payment token and a payment type associated with the payment method;
- encoding the string of information and the payment details as the payment code;
- rendering the payment code on a display of a mobile device for a shopper to present to a terminal for a frictionless payment during a transaction at the terminal;
- identifying, by one or more overhead cameras, the payment code when presented on the display of the mobile device and the mobile device is positioned on a tray of the terminal alongside items being purchased with the display facing towards the one or more of the one or more overhead cameras, such that an item recognizer of the terminal recognizes the mobile device as a non-salable personal item of the shopper and captures the payment code from the display to provision to a transaction manager of the terminal;
- recognizing, by the transaction manager, the payment code as a payment request;
- displaying, on a terminal display, a countdown timer and a message indicating that a payment for the transaction will proceed in accordance with the countdown timer unless canceled by the shopper via a touch option presented on the terminal display; and
- processing the payment type associated with the payment code using the payment details as the payment for the transaction based on recognition of the payment request unless canceled by the shopper before the countdown timer expires, wherein receiving further includes receiving a store identifier for a store associated with the terminal.

12. The method of claim 11, wherein identifying further includes selecting the payment method from a plurality of payment methods associated with the shopper based on the store associated with the terminal.

13. The method of claim 11, wherein identifying further includes presenting available payment methods to the shopper through an interface of the mobile device based on the store associated with the terminal and receiving the payment method as a selection made by the shopper from the available payment methods.

14. The method of claim 11, wherein appending further includes adding a loyalty account associated with the shopper to the string of information.

15. The method of claim 11, wherein appending further includes adding an expiration date and time and a total number of uses for the payment code to the string of information.

16. The method of claim 11, wherein encoding further includes providing the payment code as a quick response (QR) code or a barcode.

17. The method of claim 11 further comprising, processing the method as a wallet application on the mobile device.

18. A system comprising:
- a server comprising at least one processor and a non-transitory computer-readable storage medium;
- the non-transitory computer-readable storage medium comprising executable instructions;
- the executable instructions when provided to or obtained by the at least one processor from the non-transitory computer-readable storage medium cause the at least one processor to perform operations, comprising:
- receiving a request for a payment code from a wallet application of a mobile device operated by a shopper;
- determining a store where the shopper wants to use the payment code as a vision-based frictionless payment during a transaction at a transaction terminal of the store;
- identifying payment services supported by the transaction terminal based on the store;
- identifying payment types supported by the payment services;
- identifying an available payment method registered to the shopper based on the payment types;
- obtaining payment details for the available payment method;
- generating a string of information comprising a payment token identifier for a payment token and a particular payment type associated with the available payment method;
- appending or prepending the string of information on the payment details;
- encoding the string of information appended on or prepended to the payment details as the payment code;
- instructing the wallet application to render the payment code on a display of the mobile device for the shopper to present the payment code alongside items being purchased for the transaction to one or more overhead cameras of the transaction terminal for a vision-based checkout with the vision-based frictionless payment;
- recognizing, by an item recognizer of the transaction terminal, the mobile device as a non-salable personal item of the shopper and capturing, by the one or more overhead cameras, an image of the payment code presented on a display of the mobile device and provisioning the payment code to a transaction manager of the transaction terminal;
- recognizing, by the transaction manager, the payment code as a payment request;

displaying, on a terminal display, a countdown timer and a message indicating that a payment for the transaction will proceed in accordance with the countdown timer unless canceled by the shopper via a touch option presented on the terminal display; and processing the particular payment type associated with the payment code using the payment details as the payment for the transaction based on recognition of the payment request unless canceled by the shopper before the countdown timer expires, wherein receiving further includes receiving a store identifier for the store associated with the terminal.

19. The system of claim 18, wherein the operations associated with the generating further include:

adding a loyalty account associated with the shopper at the store, an expiration date and time of day for the payment code, and a total number of uses for the payment code to the string of information.

* * * * *